3,200,598
WAVE DAMPER DEVICE
John C. Krepak, 315 Sklar Bldg., Shreveport, La.
Filed Oct. 19, 1961, Ser. No. 146,103
4 Claims. (Cl. 61—5)

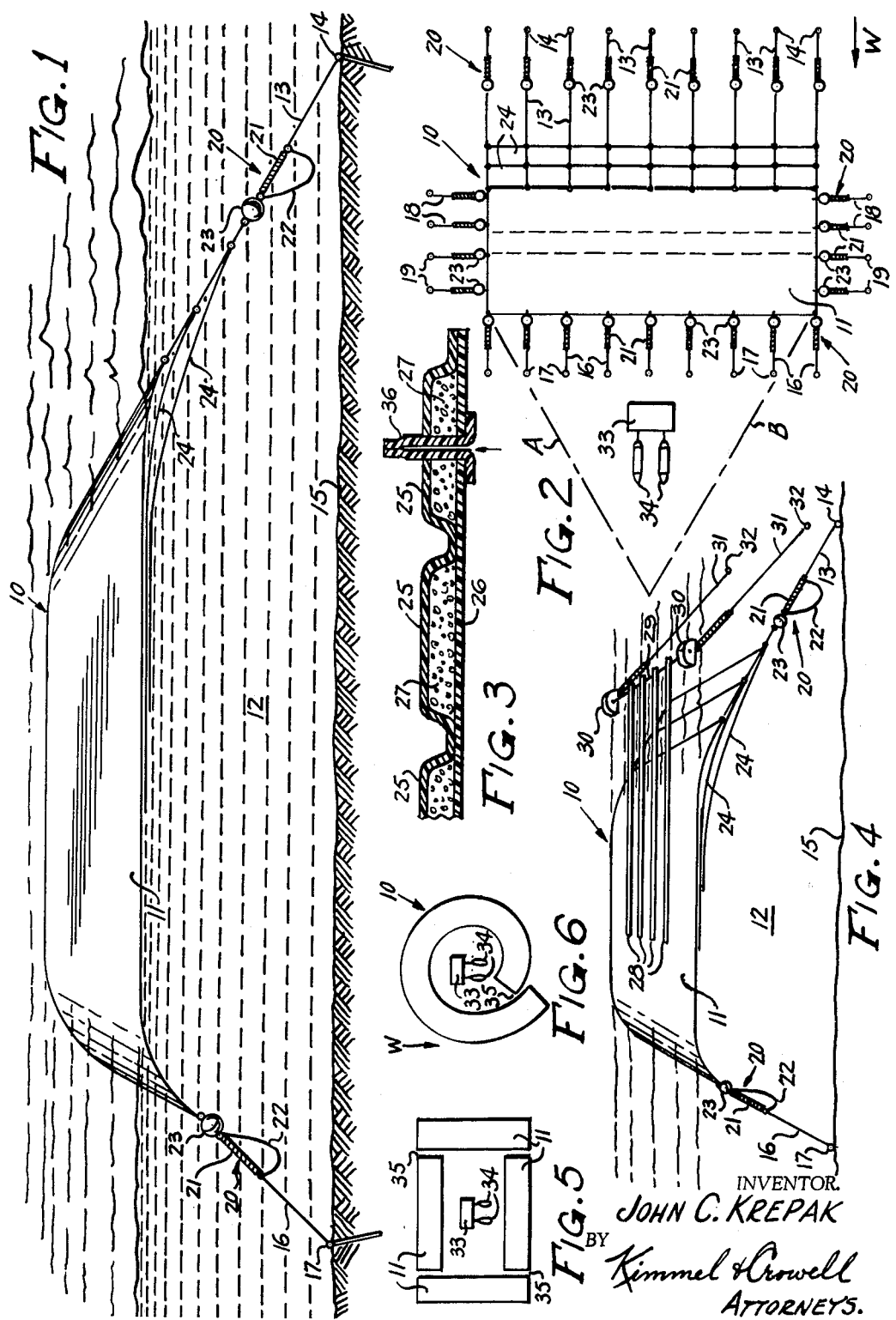

This invention relates to a wave damper and more particularly to a wave damper designed to reduce the size and force of waves and swells caused by high winds, storms, and hurricanes originating off shore.

The primary object of the invention is a wave damper designed to protect off shore installations and moorings from the pressure of large waves and swells driven by heavy winds.

A further object of the invention is a wave damper of relatively simple construction which may be assembled in any desired location.

Another object of the invention is a wave damper simple in design, efficient in operation, and lower in manufacturing cost than other similar type devices.

Further objects and advantages of the present invention will become readily apparent by referring to the following detailed description when taken with the accompanying drawings wherein:

FIGURE 1 is a perspective view illustrating the wave damper constructed in accordance with the teachings of the present invention.

FIGURE 2 is a plan view of the wave damper shown in FIG. 1 illustrating the manner of installation and in dotted lines the area of relative calm effected by such installations.

FIGURE 3 is an enlarged cross-sectional view of the mat forming part of the present invention illustrating the manner in which a plurality of air cells are formed in said mat.

FIGURE 4 is a perspective view of the wave damper illustrated in FIG. 1 and showing a slightly modified form of construction.

FIGURE 5 is a plan view of the wave damper illustrating an alternate manner of installation.

FIGURE 6 is a plan view of the wave damper illustrating still another manner of installation.

Referring to FIG. 1, the wave damper 10 of the present invention is shown as comprising a substantially rectangular top mat 11. The top mat 11 can be constructed of a plastic material or other impervious material. The top mat is buoyantly supported on the surface of the body of water 12 and is provided with a plurality of air cells, the construction of which will be later described.

One of the longitudinal edges of the rectangular sheet 11 is disposed windward and is submerged below the surface of the water 12. The edge is held in a submerged position by a plurality of cables 13 secured to a plurality of anchors 14 on the bottom 15 of the body of water 12. The opposing longitudinal edge of the top mat 11 is also submerged below the surface of the water 12 by a plurality of cables 16 secured to a plurality of anchors 17. The sides of the top mat 11 are similarly positioned by cables 18 and corresponding anchors 19.

Interposed between the anchors 14, 17, 19 and the top mat 11 in a submerged position on the cables 13, 16, 18 are shock absorbers 20 comprised of springs 21 and safety cables 22. Positioned immediately above the shock absorbers 20 are buoyant floats 23.

Spaced in descending relationship to the top mat 11 are a plurality of secondary rectangular buoyant mats 24. The mats 24 are secured along their respective windward longitudinal edges to the cables 13 above the shock absorbers 20. The remaining edges of the secondary mats 24 are left to float free under the top mat 11 and will, because of their buoyancy, lie directly under the top mat 11 under normal conditions.

As seen in FIG. 3, the mats 11, 24 are constructed in a manner which provides a plurality of air cells 25 providing the mats 11, 24 with substantial buoyancy. Flexible one-way plastic check valves 36 are installed at intervals through mats 11, 24 to allow air or trapped gases as at arrow A to escape from under mats 11, 24. As shown, the plane surface 26 of the mats has secured thereover a second sheet 27 of like material which may be plastic or other suitable impervious material which is secured to the surface 26 at spaced points by heat sealing or other means.

A slightly modified form of the wave damper is shown in FIG. 4. In this instance, the wave damper as illustrated in FIGS. 1 and 2 is further provided with a plurality of elongated members 28 pivotally mounted on cable 29 suspended between floats 30 positioned by cables 31 secured to anchors 32. The elongated members 28 extend horizontally over the mat 11 and have their free ends in contact therewith.

The detailed manner of installation of the wave damper is shown in FIG. 2. As illustrated, the mats 11, 24 are positioned so that the long dimension will meet the waves coming in the direction of the wind illustrated by the arrow W. On the lee side of the wave damper is created an area of relative calm, indicated by dotted lines AB, in which there is provided an anchorage 33 to which vessels 34 may be secured. This area is illustrated as substantially triangular in configuration.

By referring to FIGS. 1 and 2, the effect of the wave damper on heavy seas and swells will become apparent. As the waves approach the damper 10, they first come in contact with the submerged leading edges of the secondary mats 24. A portion of the descending energy in the wave is forced to transmit its energy between the top mat 11 and the secondary mats 24. A portion of the descending wave breaks over the edge of the top mat 11 and depresses it momentarily. As the top mat 11 comes to the surface, it pushes this part of the wave back in the direction of the oncoming waves.

Where the modified installation of FIG. 4 is used the elongated members 28 help break up the descending wave by interrupting the smooth transfer of energy and throwing the waves out of harmony. The energy of the water just below the surface and passing under the top mat 11 is dampened by the pressure exerted by the atmosphere pushing down on the top mat 11 and by the weight of the water held against the underside of the top mat 11 by the atmospheric pressure bearing down on the surface of the water surrounding the mat 11 and by the buoyancy of the secondary mats 24 pushing up. The extent of the pressure exerted by the atmosphere on the top mat 11 and by the weight of the water held against the underside of the top mat 11 and by the buoyancy of the secondary mats 24 is great enough whereby the energy in a single wave is not sufficient to transmit its energy to the lee side thereof. By providing a wave damper such as that disclosed herein it will be readily seen that the energy of movement of the water in waves on the surface of the water as well as the energy of movement of the water just below the surface is readily dissipated, providing an area of safe, calm, relatively undisturbed water on the lee side of the top mat 11 whereby a safe anchorage for vessels can be provided as well as an area of relative calm in which offshore structures may be constructed.

FIGS. 5 and 6 illustrate alternate methods of positioning the wave damper 10 around an anchorage 33 for vessels 34 to provide a substantially greater area of calm than was created by the installation of FIG. 2. FIG. 5 shows a substantially circular arrangement of the damper 10 with overlapping ends to provide an entrance as at 35. FIG. 6 shows a substantially rectangular arrangement of the mats 11 with entrances for the vessels 34 being provided as at 35.

In either of the configurations shown in FIGS. 5 and 6, the form disclosed in FIG. 1 or the modification shown in FIG. 4 may be used.

While the invention has been described in its preferred embodiments, it will become apparent to those skilled in the art that there are modifications and variations thereof. Such modifications and variations are considered to be within the scope and spirit of the appended claims.

I claim:

1. A wave damper for a body of water comprising a first buoyant impervious sheet on the surface of the water, a plurality of secondary impervious buoyant sheets disposed in underlying relation to said first buoyant sheet, cable means anchoring opposed submerged elongated edge portions of said first sheet to the bottom of the body of water, the remaining area of said first sheet floating on the surface of the water, opposed elongated edge portions of said secondary sheets being submerged and secured below the surface of the water, the remaining area of said secondary sheets extending under said cable means and floating near the surface of the water under said first sheet, said secondary sheets including a plurality of elongated parallel spaced members disposed horizontally over said first sheet, supporting means carrying one end of each elongated member, the other end of each elongated member being free and in contact with said first sheet.

2. A wave damper as defined in claim 1 wherein said supporting means includes a first cable pivotally connecting said elongated members in spaced relationship, a float disposed at each end of said cable, and second anchored cables secured to each of said floats.

3. A wave damper comprising a first buoyant rectangular mat including a plurality of air cells supported on the surface of a body of water, one edge of said sheet being disposed to windward, a first plurality of cables secured to said one edge, spring shock absorbers in each cable, anchors secured to each cable, said anchors holding said one edge in submerged position, a further plurality of cables secured to the opposite edge of said mat, spring shock absorbers in said further plurality of cables, anchors secured to each of said last-mentioned cables, said last-mentioned anchors holding said opposite edge in submerged position, a plurality of secondary rectangular buoyant mats of substantially the same width as said first mat and being secured along one of their edges in spaced descending relation to said first-mentioned plurality of cables above the shock absorbers thereon and extending under said first-mentioned plurality of cables, said secondary mats having their opposite edge free to float upwardly into contact with the undersurface of said first buoyant mat and flexible one-way check valves installed at spaced intervals in each of said mats.

4. A wave damper comprising a first buoyant rectangular mat including a plurality of air cells supported on the surface of a body of water, one edge of said sheet being disposed to windward, a first plurality of cables secured to said one edge, spring shock absorbers in each cable, anchors secured to each cable, said anchors holding said one edge in submerged position, a further plurality of cables secured to the opposite edge of said mat, spring shock absorbers in said further plurality of cables, anchors secured to each of said last-mentioned cables, said last-mentioned anchors holding said opposite edge in submerged position, a plurality of secondary rectangular buoyant mats of substantially the same width as said first-mentioned mat and being secured along one of their edges in spaced descending relation to said first-mentioned plurality of cables above the shock absorbers thereon and extending under said first-mentioned plurality of cables, said secondary mats having their opposite edge free to float upwardly into contact with the undersurface of said first buoyant mat, flexible one-way check valves installed at spaced intervals in each of said mats, a pair of additional anchors spaced from said first-mentioned anchors, cables secured to said additional anchors and extending outwardly and downwardly with respect to said one edge of said first mat, a transverse cable secured between the tops of said last-mentioned cables, floats secured to said transverse cable, and a plurality of elongated members secured to said transverse cable in spaced relationship and extending horizontally over said first mat and having free ends in contact therewith.

References Cited by the Examiner

UNITED STATES PATENTS

| 727,175 | 5/03 | Miller | 114—215 |
| 1,621,809 | 3/27 | Petersen | 114—230 |
| 2,527,995 | 10/50 | Hamilton | 14—27 |
| 3,022,632 | 2/62 | Parks | 61—5 |
| 3,029,606 | 4/62 | Olsen | 61—5 |

FOREIGN PATENTS 91,910  3/23  Austria.

EARL J. WITMER, *Primary Examiner.*

WILLIAM I. MUSHAKE, JACOB SHAPIRO, JACOB L. NACKENOFF, *Examiners.*